(12) United States Patent
Richter

(10) Patent No.: US 11,468,611 B1
(45) Date of Patent: Oct. 11, 2022

(54) METHOD AND DEVICE FOR SUPPLEMENTING A VIRTUAL ENVIRONMENT

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/859,794

(22) Filed: Apr. 27, 2020

Related U.S. Application Data

(60) Provisional application No. 62/848,959, filed on May 16, 2019.

(51) Int. Cl.
*G06T 11/60* (2006.01)
*G06F 3/01* (2006.01)
*G06V 20/40* (2022.01)

(52) U.S. Cl.
CPC .............. *G06T 11/60* (2013.01); *G06F 3/011* (2013.01); *G06V 20/40* (2022.01)

(58) Field of Classification Search
CPC ... G06T 11/60; G06T 19/006; G06K 9/00711; G06F 3/011; G06V 20/40
See application file for complete search history.

(56) References Cited

U.S. PATENT DOCUMENTS

| | | | |
|---|---|---|---|
| 9,613,448 B1 | 4/2017 | Margolin | |
| 9,952,820 B2 | 4/2018 | Anderson et al. | |
| 10,569,164 B1 * | 2/2020 | Bleasdale-Shepherd | A63F 13/86 |
| 10,818,093 B2 * | 10/2020 | Chen | G06T 5/20 |
| 10,896,219 B2 * | 1/2021 | Tokuchi | G06F 3/0482 |
| 11,141,656 B1 * | 10/2021 | Cooper | A63F 13/35 |
| 2002/0191862 A1 * | 12/2002 | Neumann | G06T 7/80 |
| | | | 382/284 |
| 2009/0106671 A1 * | 4/2009 | Olson | G06F 3/011 |
| | | | 715/757 |
| 2011/0037712 A1 * | 2/2011 | Kim | H04M 1/72457 |
| | | | 345/173 |
| 2011/0227913 A1 * | 9/2011 | Hyndman | A63F 13/211 |
| | | | 345/419 |
| 2012/0127284 A1 | 5/2012 | Bar-Zeev et al. | |
| 2014/0028850 A1 * | 1/2014 | Keating | G06T 7/246 |
| | | | 348/158 |
| 2014/0096084 A1 * | 4/2014 | Kwon | G06F 3/04842 |
| | | | 715/835 |

(Continued)

*Primary Examiner* — Motilewa Good-Johnson
(74) *Attorney, Agent, or Firm* — Fernando & Partners, LLP

(57) ABSTRACT

In some implementations, a method is performed at a device including non-transitory memory and one or more processors. The method includes: presenting, by the device, a computer-generated reality (CGR) environment; while presenting the CGR environment, detecting access to a display device separate from the device; in response to determining that there is access to the display device, triggering the display of video content, associated with the CGR environment, on the display device in order to supplement the CGR environment; and modifying at least a portion of the CGR environment based on the video content displayed by the display device. In some implementations, the display device is present within a physical environment, and the device enables video pass-through or optical see-through of at least a portion of the physical environment including the display device.

26 Claims, 11 Drawing Sheets

(56) References Cited

U.S. PATENT DOCUMENTS

| | | | |
|---|---|---|---|
| 2014/0192084 A1* | 7/2014 | Latta | G06F 21/00 345/633 |
| 2014/0292809 A1* | 10/2014 | Tsurumi | G06F 3/04815 345/633 |
| 2015/0125045 A1* | 5/2015 | Gauglitz | G06T 7/246 382/107 |
| 2015/0243078 A1* | 8/2015 | Watson | G06F 3/012 345/547 |
| 2015/0348322 A1 | 12/2015 | Ligameri et al. | |
| 2016/0071319 A1* | 3/2016 | Fallon | G06T 19/006 345/633 |
| 2016/0247324 A1* | 8/2016 | Mullins | G02B 27/0179 |
| 2016/0358383 A1* | 12/2016 | Gauglitz | G06F 3/0304 |
| 2017/0004655 A1* | 1/2017 | Scavezze | G06T 19/20 |
| 2017/0287215 A1 | 10/2017 | Lalonde et al. | |
| 2018/0061128 A1 | 3/2018 | Cabanier et al. | |
| 2018/0314066 A1* | 11/2018 | Bell | G09G 5/10 |
| 2019/0043447 A1* | 2/2019 | Chung | G06F 3/04815 |
| 2019/0058923 A1* | 2/2019 | Champy | H04N 21/00 |
| 2019/0073110 A1* | 3/2019 | Bradley | G06T 11/60 |
| 2019/0199993 A1* | 6/2019 | Babu J D | H04N 13/128 |
| 2019/0295324 A1* | 9/2019 | Servant | A63F 13/5258 |
| 2019/0362560 A1* | 11/2019 | Choi | G06F 3/011 |
| 2020/0053253 A1* | 2/2020 | Kavallierou | H04N 21/43079 |
| 2020/0097068 A1* | 3/2020 | Hamidi-Rad | G06F 3/04815 |
| 2020/0306645 A1* | 10/2020 | Patel | A63F 13/795 |
| 2020/0394012 A1* | 12/2020 | Wright, Jr. | G02B 27/0101 |
| 2021/0035367 A1* | 2/2021 | Verma | G06T 19/006 |
| 2021/0090035 A1* | 3/2021 | Tate | G06Q 30/0641 |
| 2021/0090035 A1* | 3/2021 | Rakshit | G06F 3/04815 |
| 2021/0272537 A1* | 9/2021 | Mak | G06F 3/147 |

* cited by examiner

METHOD AND DEVICE FOR SUPPLEMENTING A VIRTUAL ENVIRONMENT

CROSS-REFERENCE TO RELATED APPLICATIONS

This application claims the benefit of U.S. Provisional Patent App. No. 62/848,959, filed on May 16, 2019, which is incorporated by reference in its entirety.

TECHNICAL FIELD

The present disclosure generally relates to virtual content (sometimes also referred to herein as "computer-generated reality (CGR) content"), and in particular, to systems, methods, and devices for supplementing a virtual environment by triggering display of video content on a display device detected within a physical environment.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space, so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's environment on a handheld display (e.g., an AR-enabled mobile phone or tablet with video pass-through). As another example, a user may experience AR content by wearing a near-eye system or head-mountable enclosure that still allows the user to see his/her surroundings (e.g., glasses with optical see-through). As yet another example, a user may experience VR content by using a near-eye system that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
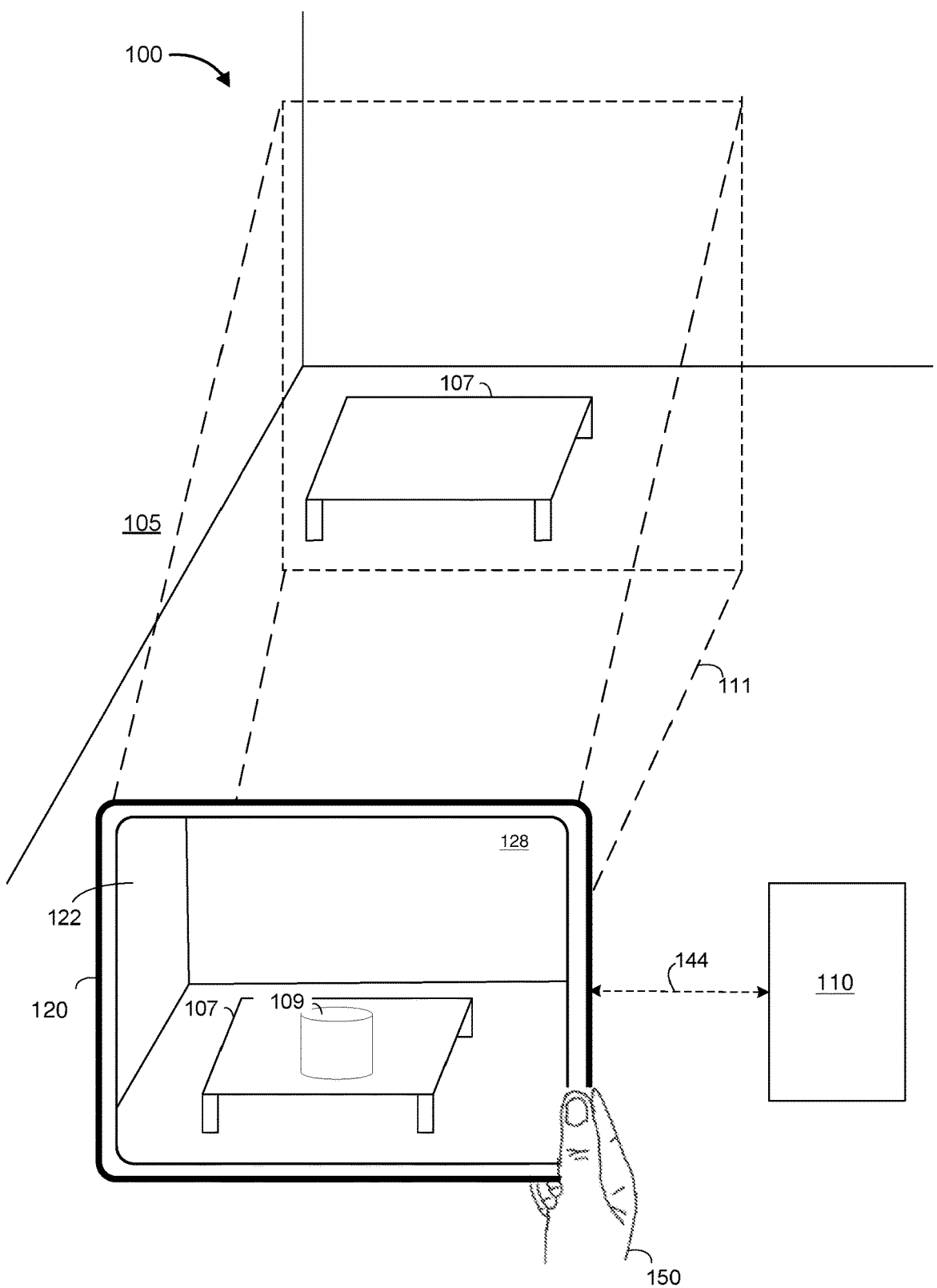
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for supplementing a computer-generated reality (CGR) environment by triggering display of video content on a display device detected within a physical environment. According to some implementations, the method is performed at a device including non-transitory memory and one or more processors coupled with the non-transitory memory. The method includes: presenting, by the device, a CGR environment; while presenting the CGR environment, detecting access to a display device separate from the device; in response to determining that there is access to the display device, triggering the display of video content, associated with the CGR environment, on the display device in order to supplement the CGR environment; and modifying at least a portion of the CGR environment based on the video content displayed by the display device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate a CGR experience for a user 150 (sometimes also referred to herein as a "CGR environment") and zero or more other users. In some implementations, the controller 110 includes a suitable combination of software, firmware, and/or hardware. The controller 110 is described in greater detail below with respect to FIG. 11. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 12.

According to some implementations, the electronic device 120 presents a computer-generated reality (CGR) experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the CGR experience, the electronic device 120 is configured to present CGR content (e.g., a CGR cylinder 109) and to enable video pass-through of the physical environment 105 (e.g., including the table 107) on a display 122. For example, the electronic device 120 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the CGR content (e.g., the CGR cylinder 109) onto the additive display, which is, in turn, overlaid on the physical environment 105 from the perspective of the user 150. In some implementations, the electronic device 120 presents the user interface by displaying the CGR content (e.g., the CGR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the CGR content (e.g., a single display or one for each eye). For example, the electronic device 120 encloses the field-of-view of the user 150. In such implementations, the electronic device 120 presents the CGR environment 128 by displaying data corresponding to the CGR environment 128 on the one or more displays or by projecting data corresponding to the CGR environment 128 onto the retinas of the user 150.

In some implementations, the electronic device 120 includes an integrated display (e.g., a built-in display) that displays the CGR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR environment 128. In some implementations, the electronic device 120 is replaced with a CGR chamber, enclosure, or room configured to present CGR content in which the user 150 does not wear the electronic device 120.

In some implementations, the controller 110 and/or the electronic device 120 cause a CGR representation of the user 150 to move within the CGR environment 128 based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
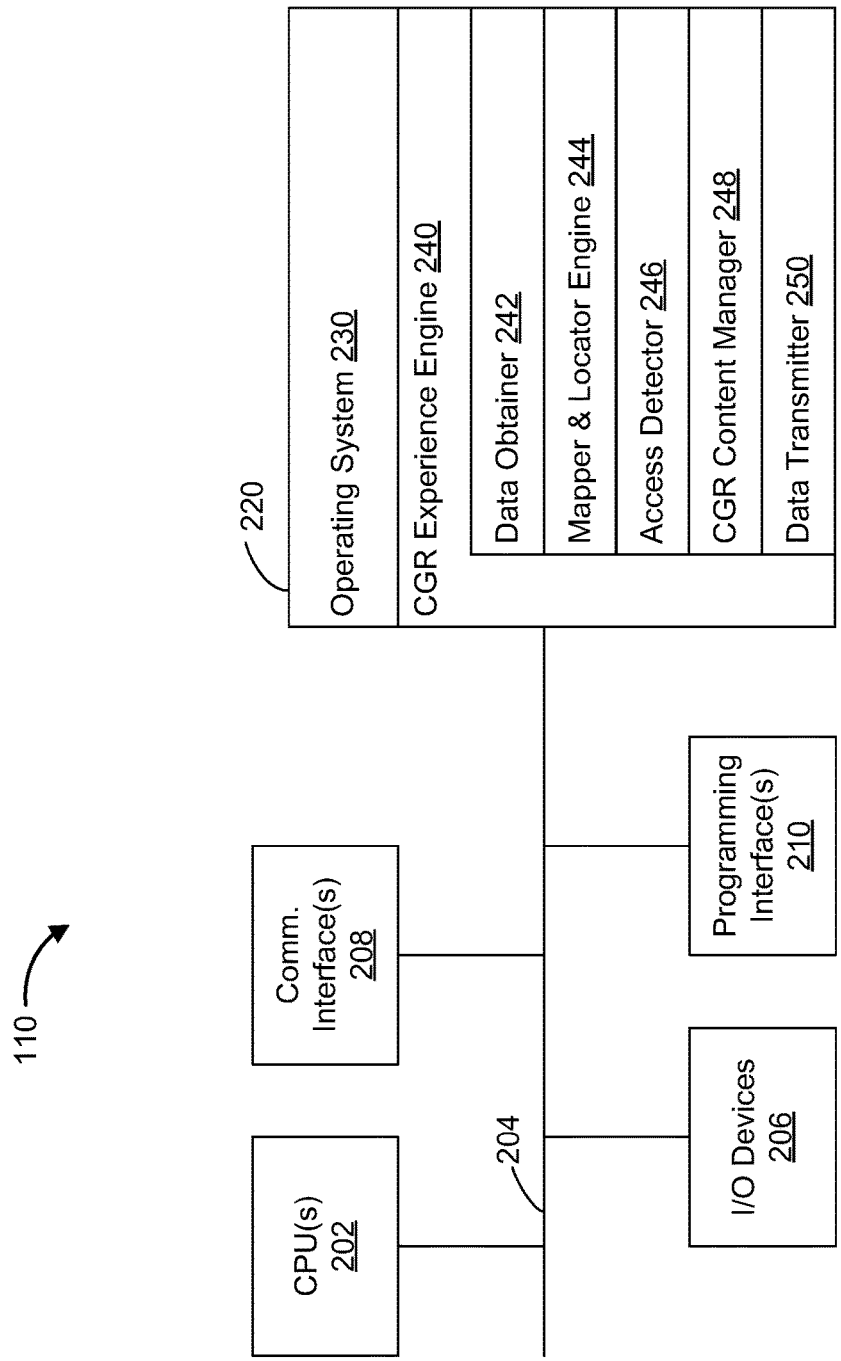
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a computer-generated reality (CGR) experience engine 240.

The operating system 230 includes procedures for handling various basic system services and for performing hardware dependent tasks.

In some implementations, the CGR experience engine 240 is configured to manage and coordinate one or more CGR experiences (sometimes also referred to herein as CGR environments) for one or more users (e.g., a single CGR experience for one or more users, or multiple CGR experiences for respective groups of one or more users). To that end, in various implementations, the CGR experience engine 240 includes a data obtainer 242, a mapper and locator engine 244, an access detector 246, a CGR content manager 248, and a data transmitter 250.

In some implementations, the data obtainer 242 is configured to obtain data (e.g., presentation data, user interaction data, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the access detector 246 is configured to identify one or more output devices (e.g., display device, audio output device, and/or the like) within a physical environment. In some implementations, the access detector 246 is also configured to determine whether the one or more output devices are capable of obtaining (e.g., receiving or retrieving) output data in order to supplement a CGR environment. To that end, in various implementations, the access detector 246 includes instructions and/or logic therefor, and heuristics and metadata therefor.

In some implementations, the CGR content manager 248 is configured to manage and modify a CGR environment presented to a user. To that end, in various implementations, the CGR content manager 248 includes instructions and/or logic therefor, and heuristics and metadata therefor.

In some implementations, the data transmitter 250 is configured to transmit data (e.g., presentation data, location data, etc.) to at least the electronic device 120. To that end, in various implementations, the data transmitter 250 includes instructions and/or logic therefor, and heuristics and metadata therefor.

Although the data obtainer 242, the mapper and locator engine 244, the access detector 246, the CGR content manager 248, and the data transmitter 250 are shown as residing on a single device (e.g., the controller 110), it should be understood that in other implementations, any combination of the data obtainer 242, the mapper and locator engine 244, the access detector 246, the CGR content manager 248, and the data transmitter 250 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
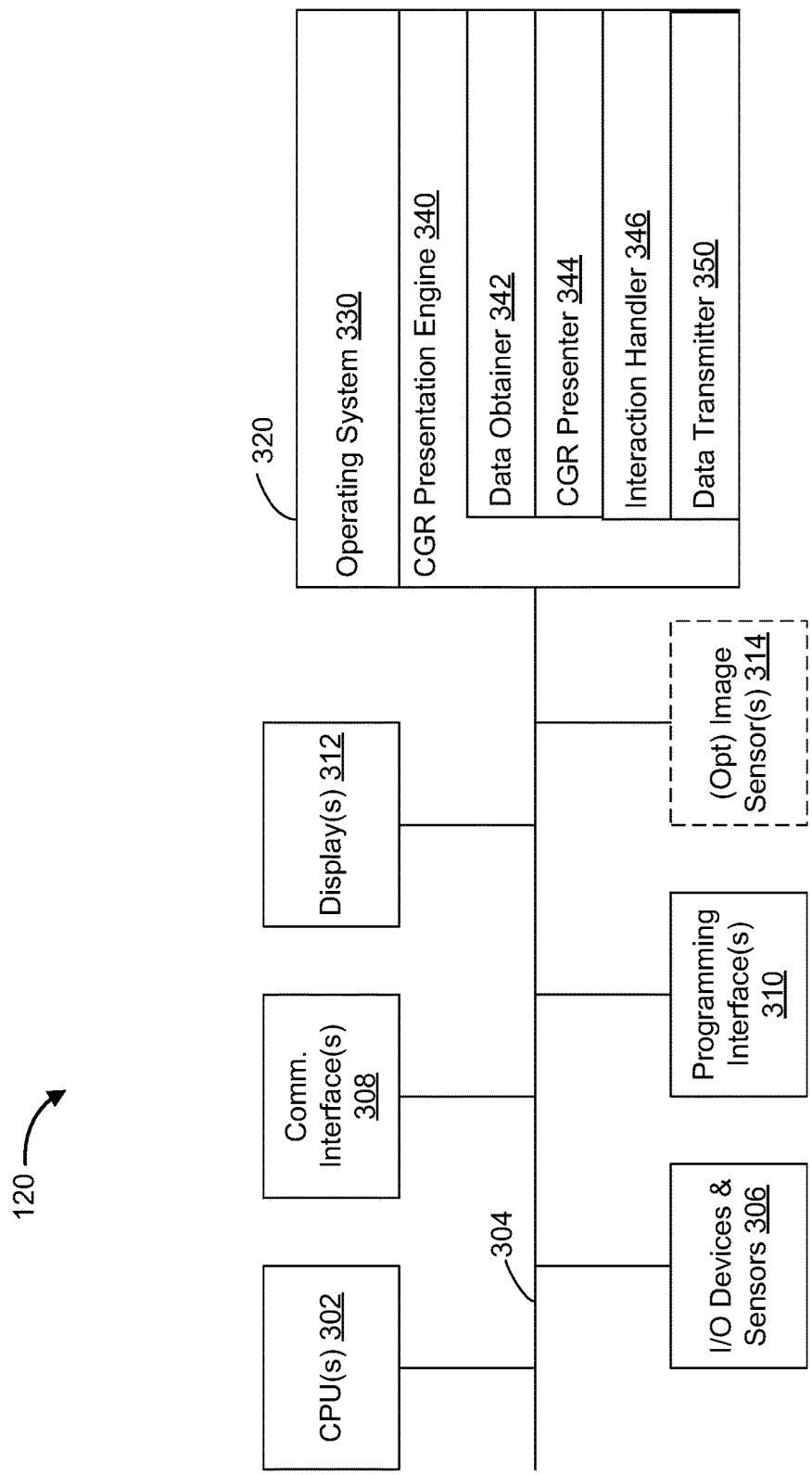
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), and/or the like.

In some implementations, the one or more displays 312 are configured to present the CGR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks. In some implementations, the CGR presentation engine 340 is configured to present CGR content to the user via the one or more displays 312. To that end, in various implementations, the CGR presentation engine 340 includes a data obtainer 342, a CGR presenter 344, an interaction handler 346, and a data transmitter 350.

In some implementations, the data obtainer 342 is configured to obtain data (e.g., presentation data, user interaction data, sensor data, location data, etc.) from at least one of the I/O devices and sensors 306 of the electronic device 120, the controller 110, and the optional remote input devices. To that end, in various implementations, the data obtainer 342 includes instructions and/or logic therefor, and heuristics and metadata therefor.

In some implementations, the CGR presenter 344 is configured to present and update CGR content via the one or more displays 312. To that end, in various implementations, the CGR presenter 344 includes instructions and/or logic therefor, and heuristics and metadata therefor.

In some implementations, the interaction handler 346 is configured to detect and interpret user interactions with the presented CGR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, etc.) to at least the controller 110. To that end, in various implementations, the data transmitter 350 includes instructions and/or logic therefor, and heuristics and metadata therefor.

Although the data obtainer 342, the CGR presenter 344, the interaction handler 346, and the data transmitter 350 are shown as residing on a single device (e.g., the electronic device 120), it should be understood that in other implementations, any combination of the data obtainer 342, the CGR presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
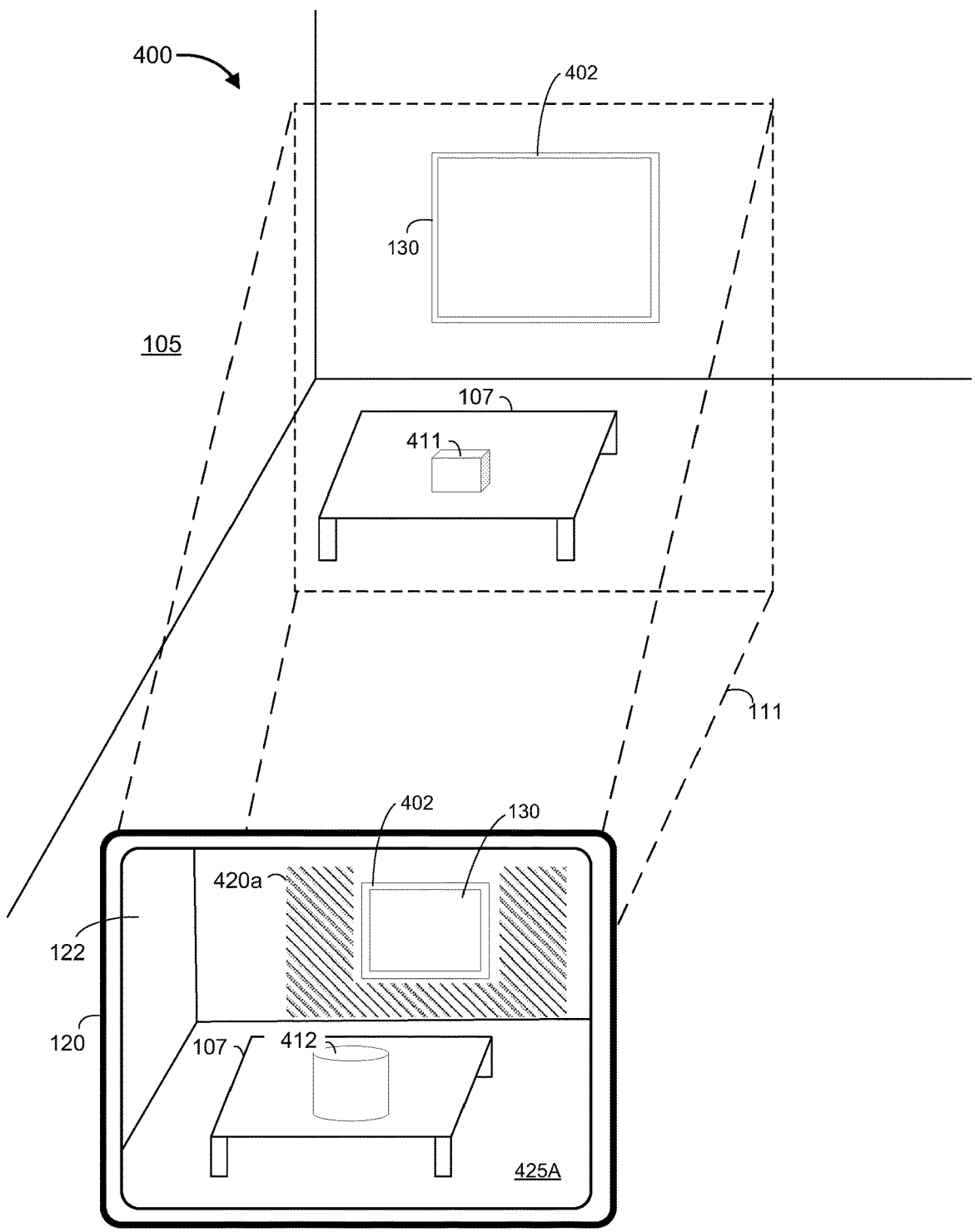
FIGS. 4A-4C illustrate a CGR presentation scenario in accordance with some implementations.
Figure 4B:
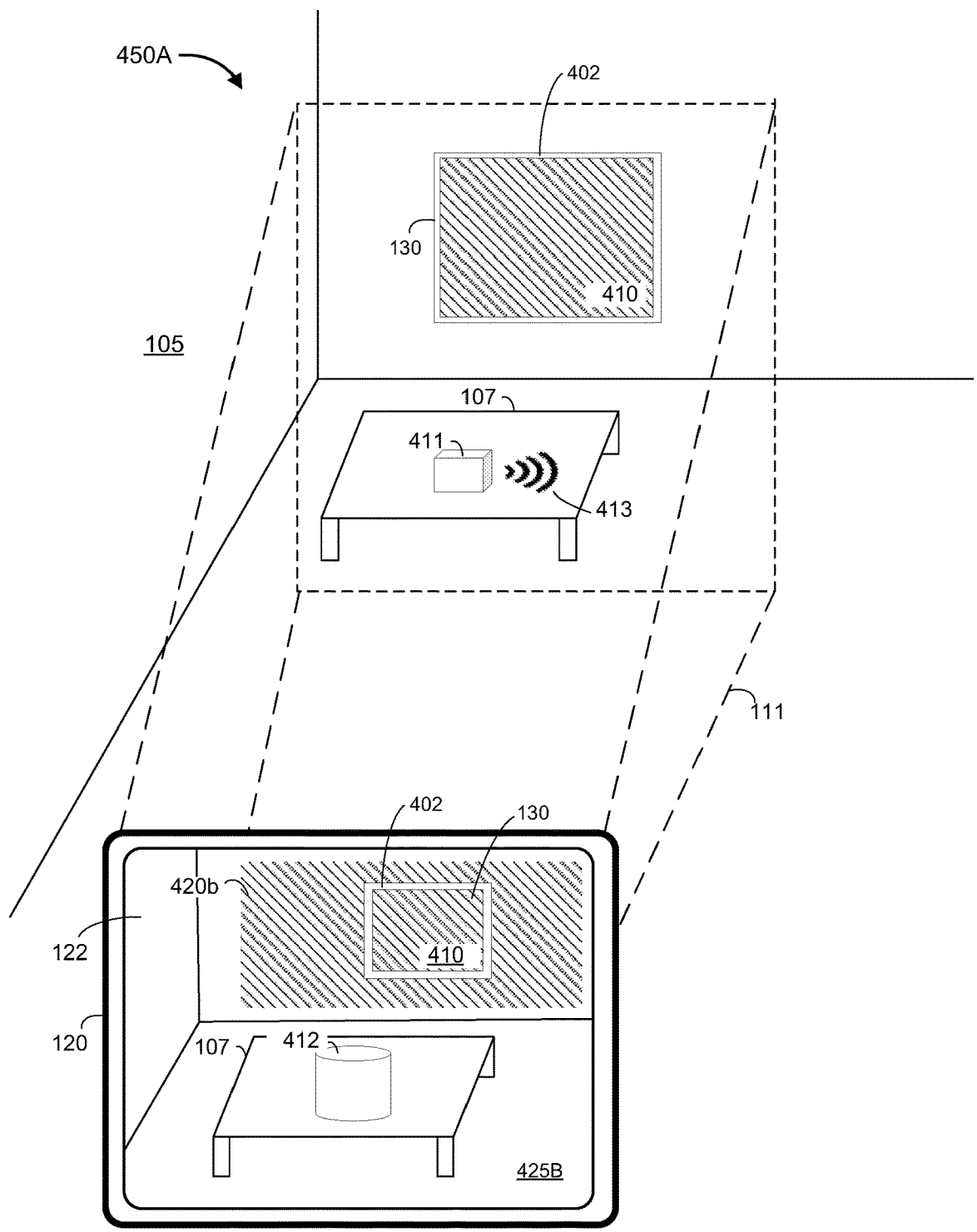
Figure 4C:
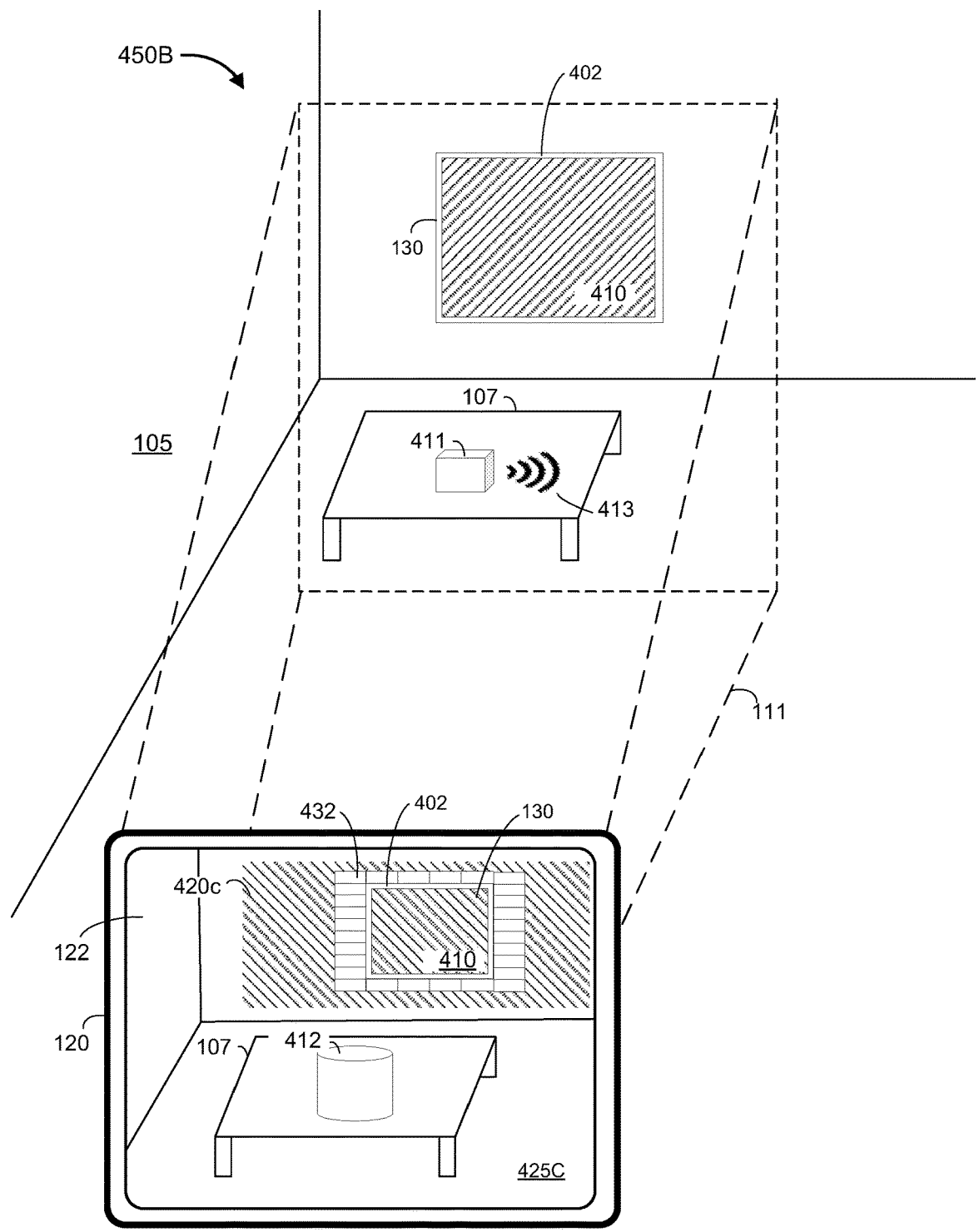

FIGS. 4A-4C illustrate a CGR presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIGS. 4A-4C show a sequence of instances 400, 450A, and 450B, respectively, of the CGR presentation scenario. As shown in FIG. 4A, the instance 400 of the presentation scenario associated with time $T_1$ includes a physical environment 105 and a CGR environment 425A displayed on the display 122 of the electronic device 120. In FIG. 4A, the physical environment 105 includes the display device 130, the table 107, and an audio output device 411 on the table 107 (e.g., a BLUETOOTH speaker, mobile phone, or the like).

The electronic device 120 presents the CGR environment 425A to the user while the user is physically present within a physical environment 105 that includes the display device 130 and the table 107 within the field-of-view 111 of an exterior-facing image sensor of the electronic device 120. As shown in FIG. 4A, the CGR environment 425A also includes CGR content 420a and a CGR cylinder 412 on the table 107 As such, the CGR cylinder 412 is composited with or is overlaid on the audio output device 411.

As such, in some implementations, the user holds the electronic device 120 in his/her hand(s). In some implementations, the electronic device 120 is configured to present CGR content (e.g., the CGR content 420a and the CGR cylinder 412) and to enable optical see-through or video pass-through of at least a portion of the physical environment 105 (e.g., including the table 107 and the display device 130) on the display 122. For example, the electronic device 120 corresponds to a mobile phone, tablet, laptop, wearable computing device, or the like.

For example, the display device 130 includes a bevel 402. As shown in FIG. 4A, the CGR content 420a does not cover the bevel 402. However, in various implementations, as will be understood by one of ordinary skill in the art, the CGR content 420a may cover the bevel 402 of the display device 130 by, for example, overlaying a portion of the CGR content 420a on the bevel 402 of the display device 130. In various implementations, as will be understood by one of ordinary skill in the art, the CGR content 420a may cover at least a portion of the display device 130 by, for example, overlaying a portion of the CGR content 420a on at least the portion of the display device 130.

As one example, in response to detecting access to the display device 130 and the audio output device 411, the CGR presentation scenario transitions from the instance 400 in FIG. 4A to the instance 450A in FIG. 4B. Detecting access to output devices (e.g., audio output device(s) and/or display device(s)) is described in more detail below with reference to block 6-2 of FIG. 6 and blocks 7-2 and 7-3 of FIG. 7.

As shown in FIG. 4B, the instance 450A of the CGR presentation scenario associated with time $T_2$ includes the physical environment 105 and the CGR environment 425B displayed on the display 122 of the electronic device 120. In FIG. 4B, the physical environment 105 includes the display device 130 displaying video content 410, the table 107, and the audio output device 411 on the table 107 presenting audio content 413. In some implementations, the video content 410 is generated or selected based on the CGR environment 425A associated with time $T_1$ in FIG. 4A or the CGR content 420a associated therewith. In some implementations, the audio content 413 is generated or selected based on the CGR environment 425A associated with the time $T_1$ in FIG. 4A or the CGR content 420a associated therewith.

In FIG. 4B, the electronic device 120 presents the CGR environment 425B to the user while the user is physically present within the physical environment 105 that includes the display device 130 presenting the video content 410 and the table 107 within the field-of-view 111 of the exterior-facing image sensor of the electronic device 120. As shown in FIG. 4B, the CGR environment 425B also includes CGR content 420b and the CGR cylinder 412 on the table 107. For example, the CGR content 420b in FIG. 4B corresponds to a modified version of the CGR content 420a in FIG. 4A (e.g., a different appearance, a different surface area, a different volumetric size, or the like). Continuing with this example, as shown in FIG. 4B, the CGR content 420b is configured in order to blend the display device 130 and the video content 410 displayed thereon into the CGR content 420b.

As such, in some implementations, the user holds the electronic device 120 in his/her hand(s). In some implementations, the electronic device 120 is configured to present CGR content (e.g., the CGR content 420b and the CGR cylinder 412) and to enable optical see-through or video pass-through of at least a portion of the physical environment 105 (e.g., including the table 107 and the display device 130 displaying the video content 410) on a display 122. For example, the electronic device 120 corresponds to a mobile phone, tablet, laptop, wearable computing device, or the like.

Alternatively, as another example, in response to detecting access to the display device 130 and the audio output device 411, the CGR presentation scenario transitions from the instance 400 in FIG. 4A to the instance 450B in FIG. 4C. As mentioned above, detecting access to output devices (e.g., audio output device(s) and/or display device(s)) is described in more detail below with reference to block 6-2 of FIG. 6 and blocks 7-2 and 7-3 of FIG. 7.

As shown in FIG. 4C, the instance 450B of the CGR presentation scenario associated with time $T_2$ includes the physical environment 105 and the CGR environment 425C displayed on the display 122 of the electronic device 120. In FIG. 4C, the physical environment 105 includes the display device 130 displaying the video content 410, the table 107 and the audio output device 411 on the table 107 presenting the audio content 413. In some implementations, the video content 410 is generated or selected based on the CGR environment 425A associated with time $T_1$ in FIG. 4A or the CGR content 420a associated therewith. In some implementations, the audio content 413 is generated or selected based on the CGR environment 425A associated with the time $T_1$ in FIG. 4A or the CGR content 420a associated therewith.

In FIG. 4C, the electronic device 120 presents the CGR environment 425C to the user while the user is physically present within the physical environment 105 that includes the display device 130 presenting the video content 410 and the table 107 within the field-of-view 111 of the exterior-facing image sensor of the electronic device 120. As shown in FIG. 4C, the CGR environment 425C also includes CGR content 420c, CGR content 432, and the CGR cylinder 412 on the table 107. For example, the CGR content 420c in FIG. 4C corresponds to a modified version of the CGR content 420a in FIG. 4A (e.g., a different appearance, a different surface area, a different volumetric size, or the like). Continuing with this example, as shown in FIG. 4C, the CGR content 432 (e.g., a CGR fireplace) is configured in order to frame the display device 130 and the video content 410 displayed thereon within the CGR content 420c.

As such, in some implementations, the user holds the electronic device 120 in his/her hand(s). In some implementations, the electronic device 120 is configured to present CGR content (e.g., the CGR content 420c, the CGR content 432, and the CGR cylinder 412) and to enable optical see-through or video pass-through of at least a portion of the physical environment 105 (e.g., including the table 107 and the display device 130 displaying the video content 410) on a display 122. For example, the electronic device 120 corresponds to a mobile phone, tablet, laptop, wearable computing device, or the like.

Figure 5A:
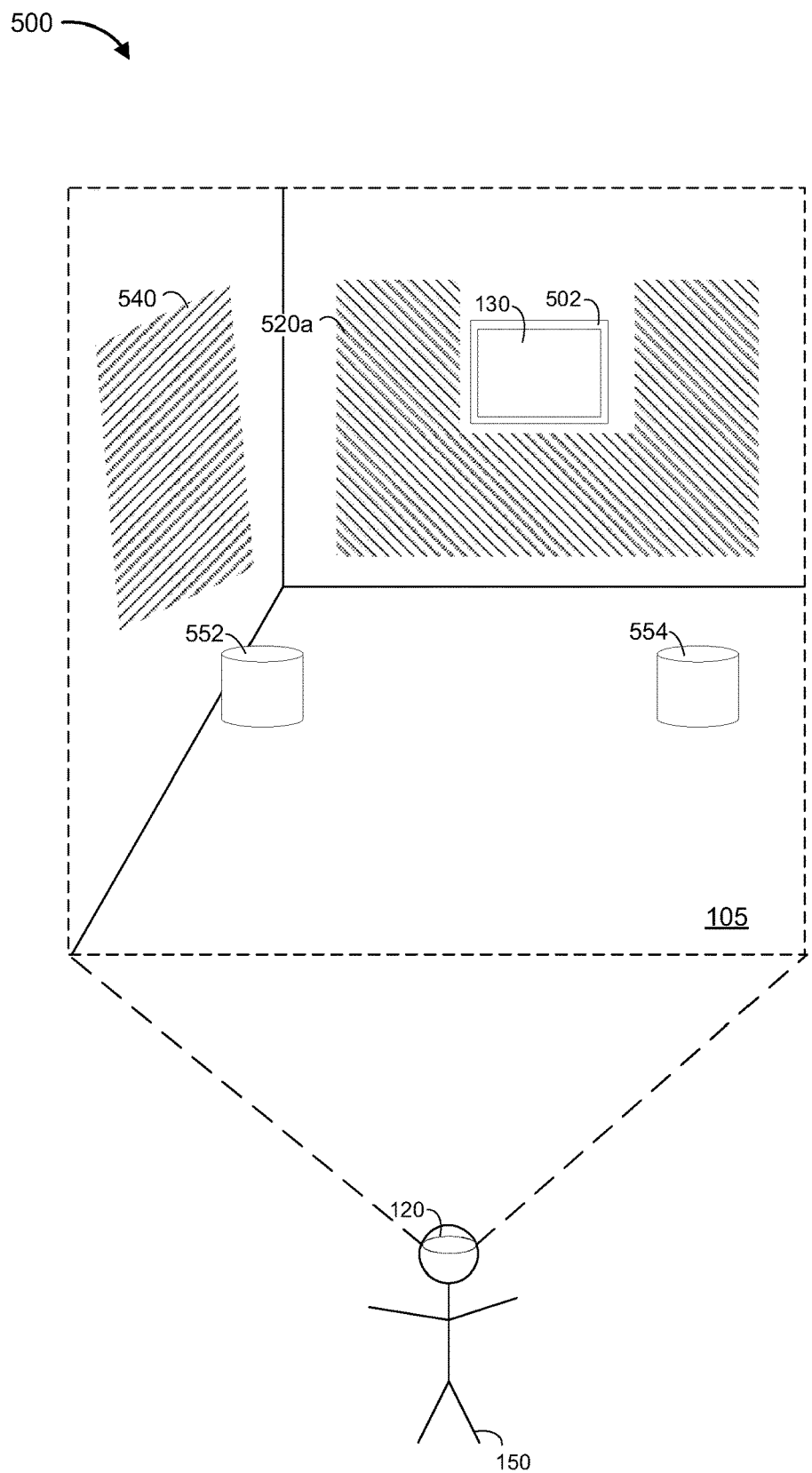
FIGS. 5A-5C illustrate a CGR presentation scenario in accordance with some implementations.
Figure 5B:
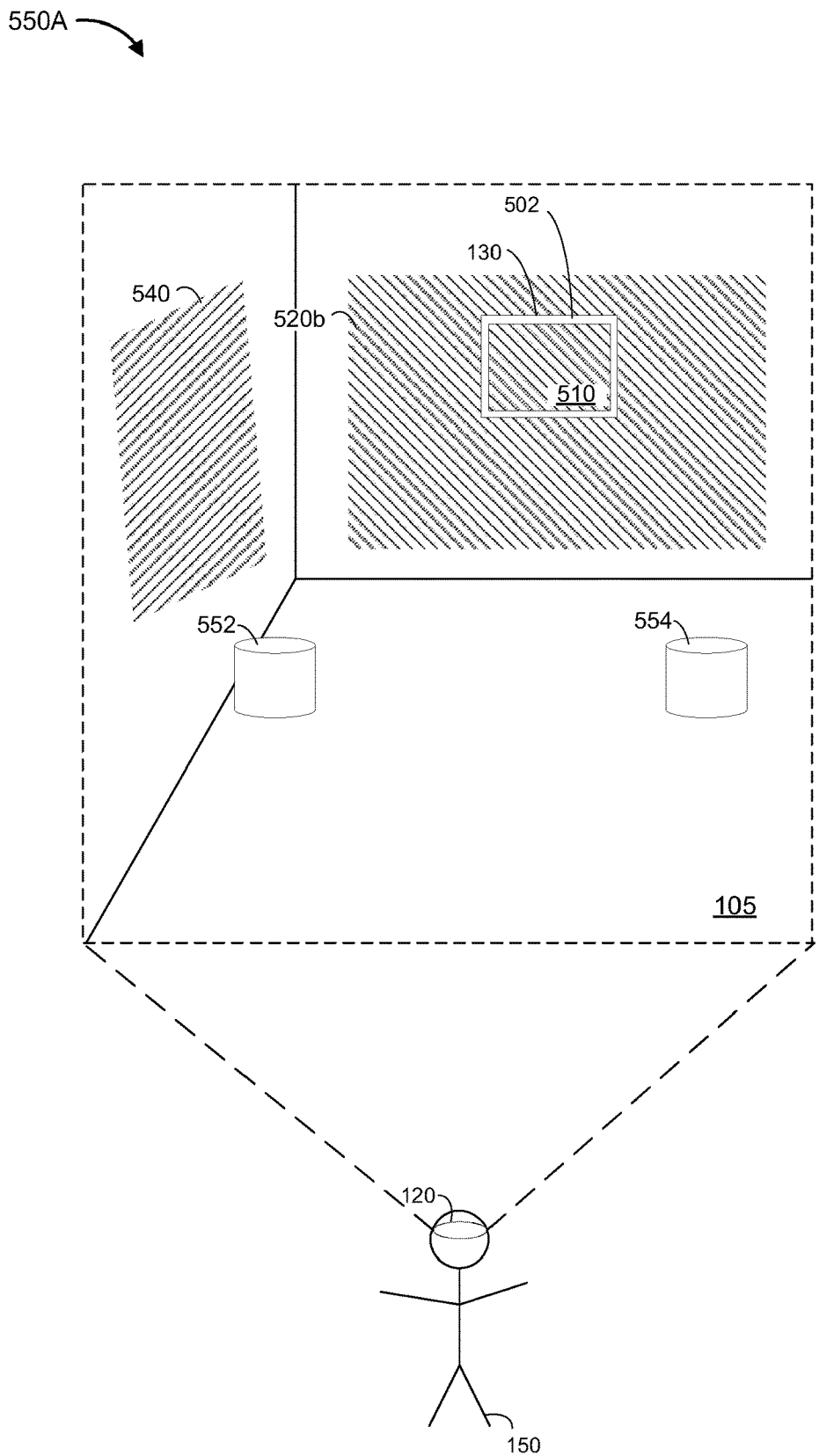
Figure 5C:
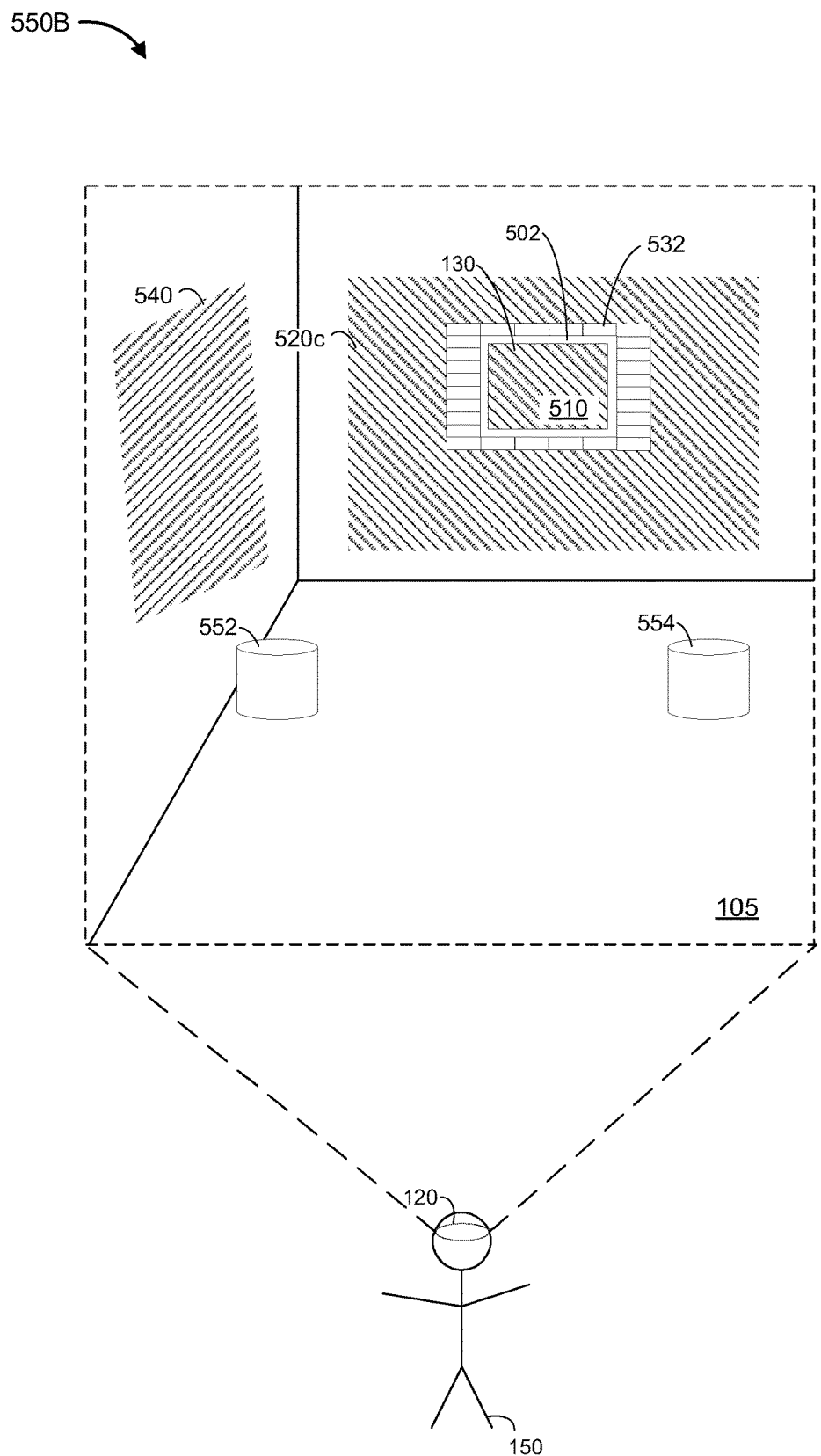

FIGS. 5A-5C illustrate a CGR presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIGS. 5A-5C show a sequence of instances 500, 550A, and 550B, respectively, of the CGR presentation scenario. As shown in FIG. 5A, the instance 500 of the presentation scenario associated with time $T_1$ includes a physical environment 105 and CGR content presented by the electronic device 120. In FIG. 5A, the physical environment 105 includes the display device 130 and the CGR content includes CGR content 520a, CGR content 540, and CGR cylinders 552 and 554.

In some implementations, the user 150 wears the electronic device 120 on his/her head such as a near-eye system. According to some implementations, the electronic device 120 presents the CGR content to the user 150 while the user 150 is virtually and/or physically present within a physical environment 105 that includes the display device 130. In some implementations, the electronic device 120 is configured to present CGR content and to enable optical see-through of the physical environment 105. In some implementations, the electronic device 120 is configured to present CGR content and to enable video pass-through of the physical environment 105.

For example, the display device 130 includes a bevel 502. As shown in FIG. 5A, the CGR content 520a does not cover the bevel 502. However, in various implementations, as will be understood by one of ordinary skill in the art, the CGR content 520a may cover the bevel 502 of the display device 130 by, for example, overlaying a portion of the CGR content 520a on the bevel 502 of the display device 130. In various implementations, as will be understood by one of ordinary skill in the art, the CGR content 520a may cover at least a portion of the display device 130 by, for example, overlaying a portion of the CGR content 520a on at least the portion of the display device 130.

As one example, in response to detecting access to the display device 130, the CGR presentation scenario transitions from the instance 500 in FIG. 5A to the instance 550A in FIG. 5B. As mentioned above, detecting access to output devices (e.g., audio output device(s) and/or display device(s)) is described in more detail below with reference to block 6-2 of FIG. 6 and blocks 7-2 and 7-3 of FIG. 7.

As shown in FIG. 5B, the instance 550A of the CGR presentation scenario associated with time $T_2$ includes the display device 130 displaying video content 510 and the CGR content includes CGR content 520b in addition to the CGR content 540 and the CGR cylinders 552 and 554. In some implementations, the video content 510 is generated or selected based on the CGR content presented at time $T_1$ in FIG. 5A such as the CGR content 520a, the CGR content 540, and the CGR cylinders 552 and 554. In some implementations, the electronic device 120 is configured to present CGR content (e.g., the CGR content 520b, the CGR content 540, and the CGR cylinders 552 and 554) and to enable optical see-through or video pass-through of at least a portion of the physical environment 105 (e.g., the display device 130 displaying the video content 510).

For example, the CGR content 520b in FIG. 5B corresponds to a modified version of the CGR content 520a in FIG. 5A (e.g., a different appearance, a different surface area, a different volumetric size, or the like). Continuing with this example, as shown in FIG. 5B, the CGR content 520b is configured in order to blend the display device 130 and the video content 510 displayed thereon into the CGR content 520b.

Alternatively, as another example, in response to detecting access to the display device 130, the CGR presentation scenario transitions from the instance 500 in FIG. 5A to the instance 550B in FIG. 5C. As mentioned above, detecting access to output devices (e.g., audio output device(s) and/or display device(s)) is described in more detail below with reference to block 6-2 of FIG. 6 and blocks 7-2 and 7-3 of FIG. 7.

As shown in FIG. 5C, the instance 550B of the CGR presentation scenario associated with time $T_2$ includes the display device 130 displaying video content 510 and the CGR content includes CGR content 520c and 532 in addition to the CGR content 540 and the CGR cylinders 552 and 554. In some implementations, the video content 510 is generated or selected based on the CGR content presented at time $T_1$ in FIG. 5A such as the CGR content 520a, the CGR content 540, and the CGR cylinders 552 and 554. In some implementations, the electronic device 120 is configured to present CGR content (e.g., the CGR content 520c, the CGR content 532, the CGR content 540, and the CGR cylinders 552 and 554) and to enable optical see-through or video pass-through of at least a portion of the physical environment 105 (e.g., the display device 130 displaying the video content 510).

For example, the CGR content 520c in FIG. 5C corresponds to a modified version of the CGR content 520a in FIG. 5A (e.g., a different appearance, a different surface area, a different volumetric size, or the like). Continuing with this example, as shown in FIG. 5C, the CGR content 532 (e.g., a CGR fireplace) is configured in order to frame the display device 130 and the video content 510 displayed thereon within the CGR content 520c.

Figure 6:
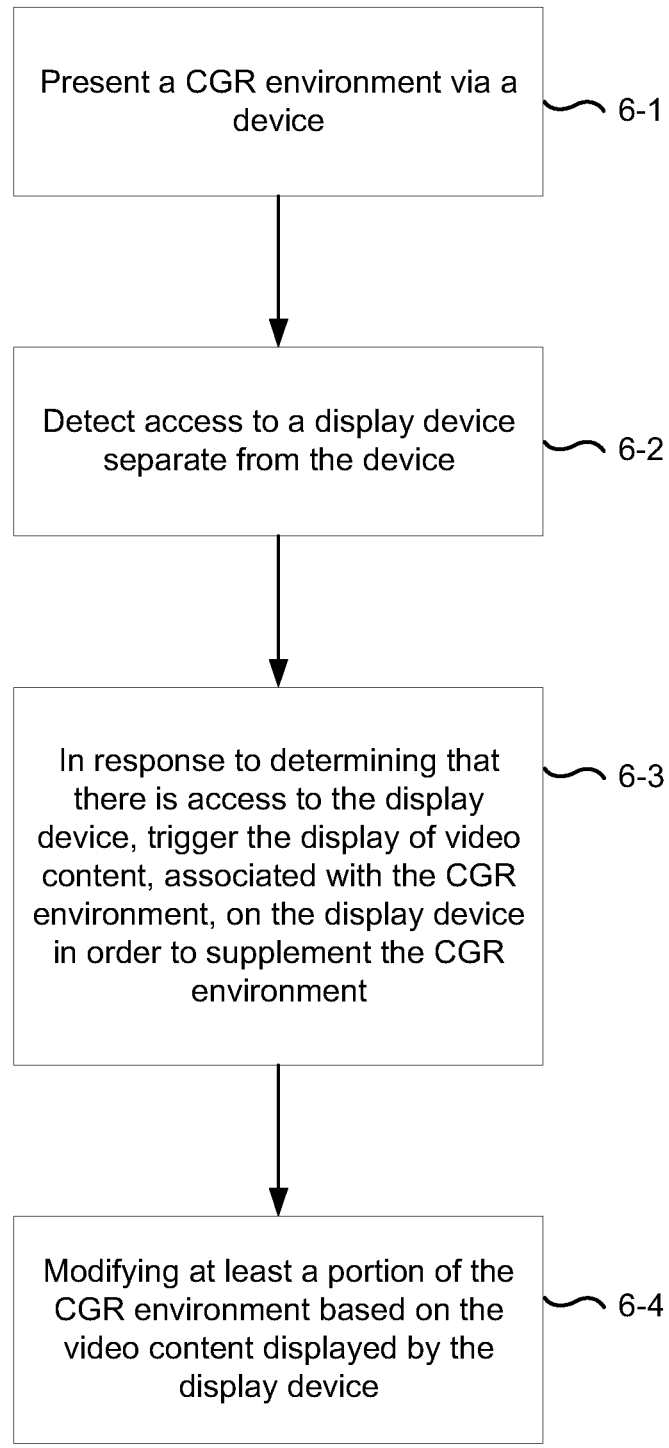
FIG. 6 is a flowchart representation of a method of supplementing a CGR environment by triggering display of video content on a display device detected within a physical environment in accordance with some implementations.

FIG. 6 is a flowchart representation of a method 600 of supplementing a CGR environment by triggering display of video content on a display device detected within a physical environment in accordance with some implementations. In various implementations, the method 600 is performed by a device with one or more processors and non-transitory memory (e.g., the controller 110 in FIGS. 1 and 2; the electronic device 120 in FIGS. 1 and 3; or a suitable combination thereof) or a component thereof. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 6-1, the method 600 includes displaying a CGR environment via the device. As one example, with reference in FIG. 5A, the CGR environment includes the CGR content 520*a*, CGR content 540, and CGR cylinders 552 and 554. In various implementations, as will be understood by one of ordinary skill in the art, the CGR content 520*a* may cover at least a portion of the display device 130.

For example, the CGR environment corresponds to a virtual workspace. For example, the CGR environment corresponds to predetermined content such as a theatrical play, movie, TV episode, historical event, fictional story, non-fictional story, live event, or the like. For example, the CGR environment corresponds to a skinned version of the user's physical surrounding and includes video-pass through or optical see-through of at least a portion of the user's physical surrounding.

As represented by block 6-2, the method 600 includes detecting access to a display device separate from the device. In some implementations, the display device corresponds to a TV, computer monitor, laptop, mobile phone, tablet, kiosk, or the like. In some implementations, the display device is situated within a physical environment in which the user is situated. For example, in FIG. 4A, the display device 130 and the audio output device 411 are located within the physical environment 105. As another example, in FIG. 5A, the display device 130 is located within the physical environment 105 that includes the user 150.

In some implementations, detecting access to the display device includes recognizing the display device after performing semantic segmentation or object recognition on image data associated with the physical environment. In some implementations, detecting access to the display device includes obtaining a beacon signal from the display device. In some implementations, detecting access to the display device includes determining that the display device is connected to a local network associated with the physical environment.

In some implementations, detecting access to the display device includes determining whether the display device is able to obtain (e.g., receive or retrieve) video content from a local or remote source. In some implementations, detecting access to the display device includes determining whether the device is able to interact/drive the display device directly. In some implementations, detecting access to the display device includes determining whether the device is able to interact/drive the display device through indirect means such an application installed on the display device, set-top box (STB), over-the-top (OTT) box, video game console, and/or the like.

As represented by block 6-3, the method 600 includes triggering the display of video content, associated with the CGR environment, on the display device in order to supplement the CGR environment in response to determining that there is access to the display device. In some implementations, the display device (and the video content displayed thereon) is not composited with CGR environment. In some implementations, the display device (and the video content displayed thereon) is shown via video pass-through or optical see-through of the physical environment. In some implementations, triggering the display of video content on the display device includes pushing the video content to the display device. In some implementations, triggering the display of video content on the display device includes requesting that the display device playback particular video content, which, in turn, is obtained and presented by the display device.

In some implementations, the video content is selected from a library of predetermined video content associated with the CGR environment. In some implementations, the video content is generated on-the-fly based on the CGR environment. In some implementations, the CGR environment includes CGR content that corresponds to predetermined content (e.g., a CGR reconstruction of a movie, TV episode, novel, historical event, etc.).

As one example, in response to detecting access to the display device 130 and the audio output device 411, the CGR presentation scenario transitions from the instance 400 in FIG. 4A to the instance 450A in FIG. 4B where the display device 130 displays video content 410 associated with the CGR environment 425A in FIG. 4A or the CGR content 420*a* associated therewith. As another example, in response to detecting access to the display device 130, the CGR presentation scenario transitions from the instance 500 in FIG. 5A to the instance 550A in FIG. 5B where the display device 130 displays video content 510 associated with the CGR content presented in FIG. 5A such as the CGR content 520*a*, the CGR content 540, and the CGR cylinders 552 and 554.

According to some implementations, the device reduces its resource consumption (e.g., CPU cycles, memory, bandwidth, battery power, energy, and/or the like) by triggering the display of video content on the display device because the device reduces its rendering overhead. In other words, the device enables optical see-through or video pass-through of the video content displayed by the display device and does not render CGR content for pixels that correspond thereto.

As represented by block 6-4, the method 600 includes modifying at least a portion of the CGR environment presented by the device based on the video content displayed by the display device. In some implementations, the device modifies at least a portion of the CGR environment by adding, removing, scaling, or otherwise changing the CGR content presented prior to triggering display of the video content by the display device. For example, prior to triggering display of the video content by the display device, the device presented the CGR environment such that CGR content covered the display device. Continuing with this, after triggering display of the video content by the display device, the device modifies the CGR environment by removing CGR content that covered the display device and enabling video pass-through of the display device.

In some implementations, the device modifies at least a portion of the CGR environment based on the video content. For example, the device modifies the CGR environment in real-time as the video content changes. In some implementations, the device modifies at least a portion of the CGR environment based on the location of the display device within the physical environment. In some implementations, modifying at least the portion of the CGR environment includes blending the display device into the CGR environment as described below with respect to block 7-5*a* of method 700. In some implementations, modifying at least the portion of the CGR environment includes framing the display device within the CGR environment as described below with respect to block 7-5*b* of method 700.

In some implementations, the method 600 includes: detecting access to an audio output device; and in response to determining that there is access to the audio output device, triggering the generation of audio content, associated with the CGR environment, via the audio output device in order to supplement the CGR environment. In some implementations, the audio output device corresponds to a mobile phone, tablet, laptop, BLUETOOTH speaker, or the like.

In some implementations, detecting access to the audio output device includes recognizing the audio output device after performing semantic segmentation or object recognition on image data. In some implementations, detecting access to the audio output device includes obtaining a beacon signal from the audio output device. In some implementations, detecting access to the audio output device includes determining that the audio output device is connected to a local network. In some implementations, detecting access to the audio output device determining whether the audio output device is able to obtain (e.g., receive or retrieve) video content from a local or remote source. In some implementations, detecting access to the audio output device includes determining whether the device is able to interact/drive the audio output device directly. In some implementations, detecting access to the audio output device includes determining whether the device is able to interact/drive the audio output device through indirect means.

Figure 7:
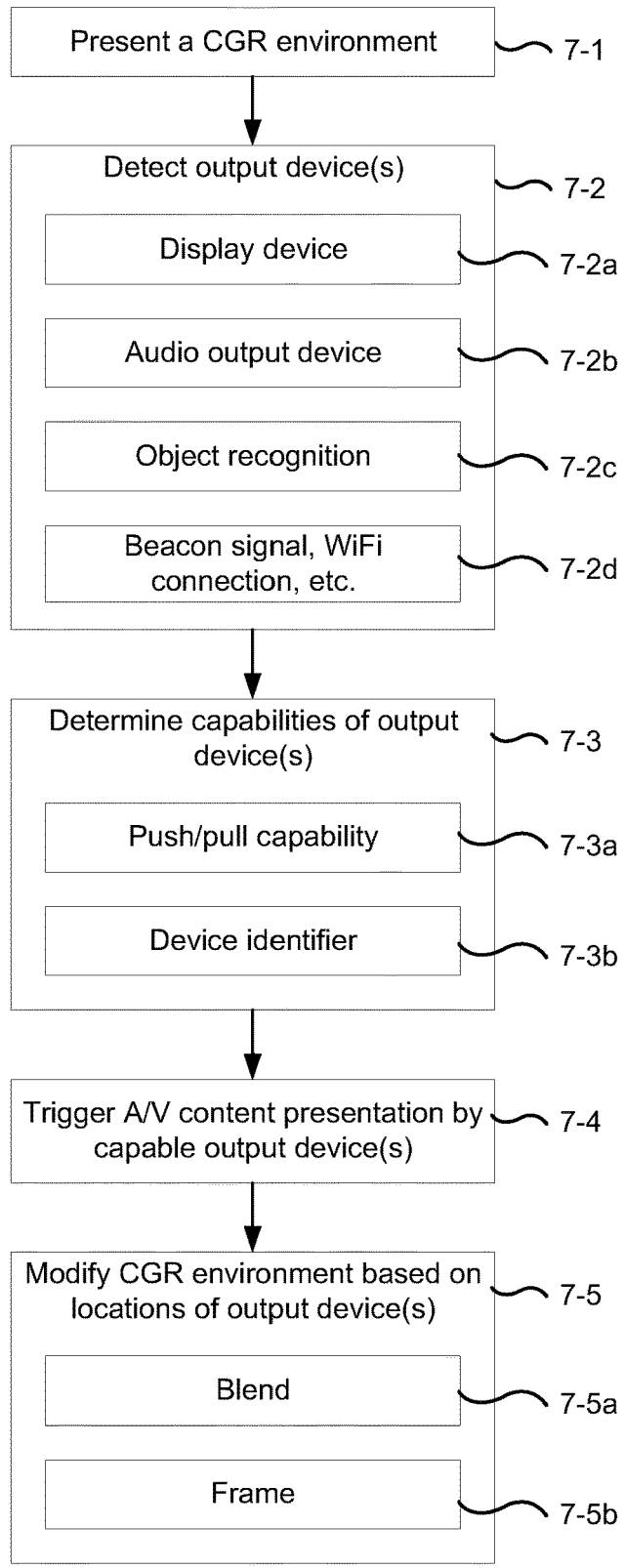
FIG. 7 is a flowchart representation of a method of supplementing a CGR environment by triggering display of video content on a display device detected within a physical environment in accordance with some implementations.

FIG. 7 is a flowchart representation of a method 700 of supplementing a CGR environment by triggering display of video content on a display device detected within a physical environment in accordance with some implementations. In various implementations, the method 700 is performed by a device with one or more processors and non-transitory memory (e.g., the controller 110 in FIGS. 1 and 2; the electronic device 120 in FIGS. 1 and 3; or a suitable combination thereof) or a component thereof. In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 7-1, the method 700 includes presenting a CGR environment. In some implementations, the CGR environment includes volumetric CGR content. In some implementations, the CGR environment is overlaid on at least a portion of a physical environment. In some implementations, the CGR environment skins at least a portion of a physical environment. In some implementations, the CGR environment is associated with predetermined content (e.g., a play, movie, TV episode, historical event, sporting event, etc.) For example, the predetermined content corresponds to a virtual workspace associated with the user. In some implementations, the CGR environment is associated with emergent content that is dynamically created.

As represented by block 7-2, the method 700 includes detecting one or more output devices. For example, the device or a component thereof (e.g., the access detector 246 in FIG. 2) detects the presence of one or more output devices within a physical environment.

In some implementations, as represented by block 7-2a, at least one of the one or more output devices corresponds to a display device. In some implementations, as represented by block 7-2b, at least one of the one or more output devices corresponds an audio output device. As one example, with reference to FIGS. 4A and 4B, the device detects access to the display device 130 and the audio output device 411 within the physical environment 105. As another example, with reference to FIGS. 5A and 5B, the device detects to the display device 130 within the physical environment 105.

In some implementations, as represented by block 7-2c, detecting the one or more output devices includes performing object recognition on image data of a physical environment in order to identify the one or more output devices. In some implementations, the device performs object recognition on image data obtained from one or more exterior-facing image sensors of the device. In some implementations, the device performs object recognition on image data obtained from cameras within the physical environment (e.g., the optional remote input devices).

In some implementations, as represented by block 7-2d, detecting the one or more output devices includes detecting a beacon signal, Wi-Fi connection, or the like associated with at least one of the one or more output devices. For example, the device detects a beacon signal from an output device indicating its presence within a physical environment. As another example, the device detects an output device that is connected to a wireless local area network (WLAN) or personal area network (PAN), for example, via near-field communication (NFC), BLUETOOTH, ZIGBEE, Wi-Fi, or the like.

As represented by block 7-3, the method 700 includes determining capabilities of the one or more output devices. For example, the device or a component thereof (e.g., the access detector 246 in FIG. 2) determines the capabilities of the one or more output devices detected in block 7-2.

In some implementations, as represented by block 7-3a, determining the capabilities of the one or more output devices includes determining whether the one or more output devices have push/pull capability. For example, the device or a component thereof (e.g., the accessor detector 246 in FIG. 2) determines whether or not the display device is capable of obtaining video content (e.g., receiving or retrieving video content).

In some implementations, determining whether or not the one or more output devices are capable of obtaining audio and/or video (A/V) content includes determining whether or not the one or more output devices have access to appropriate software. For example, the device determines whether or not the one or more output devices are connected to an STB, OTT box, video game console, and/or the like. For example, the device determines whether or not the display device has a video delivery application installed that is capable of obtaining video content (e.g., push/pull capability). In some implementations, determining whether or not the one or more output devices are capable of obtaining A/V content includes determining whether or not one or more output devices are connected to a network such as a WLAN, PAN, and/or the like via NFC, BLUETOOTH, ZIGBEE, Wi-Fi, and/or the like In some implementations, as represented by block 7-3b, determining the capabilities of the one or more output devices based on device identifiers associated with the one or more output devices. For example, the device or a component thereof (e.g., the access detector 246) determines capabilities of the one or more output devices based on device identifiers such as a serial number (e.g., detected in image data or within data packets), a media access control (MAC) address, or other identification information. For example, the device determines the capabilities and characteristics (e.g., size, resolution etc.) of the display device based on its serial number, MAC address, or other identification information.

As represented by block 7-4, the method 700 includes triggering A/V to be presented by capable output devices from among the one or more output devices. In some implementations, triggering A/V content presentation includes pushing A/V content to the one or more output devices capable of receiving A/V content. In some implementations, triggering A/V content presentation includes requesting that A/V content be retrieved by the one or more output devices capable of retrieving A/V content.

As one example, in response to detecting access to the display device 130 and the audio output device 411, the CGR presentation scenario transitions from the instance 400 in FIG. 4A to the instance 450B in FIG. 4B where the display device 130 displays video content 410 associated with the CGR environment 425A in FIG. 4A or the CGR content 420a associated therewith. As another example, in response to detecting access to the display device 130, the CGR presentation scenario transitions from the instance 500 in FIG. 5A to the instance 550A in FIG. 5B where the display device 130 displays video content 510 associated with the CGR content presented in FIG. 5A such as the CGR content 520a, the CGR content 540, and the CGR cylinders 552 and 554.

In some implementations, the display device is present within the physical environment. In some implementations, the device enables video pass-through of at least a portion of the physical environment including the display device. In some implementations, the device enables optical see-through of at least a portion of the physical environment including the display device.

As represented by block 7-5, the method 700 includes modifying the CGR environment based on locations of the one or more output devices. For example, in response to determining that there is access to the display device, the device or a component thereof (e.g., the CGR content manager 248 in FIG. 2) modifies the CGR environment by changing the appearance, surface area, volumetric size, or the like of associated CGR content.

In some implementations, as represented by block 7-5a, modifying the CGR environment includes blending the one or more output devices into the CGR environment. For example, the video content corresponds to a portion of the CGR environment and blends therewith. In some implementations, the device modifies the CGR environment based on coordinates of the display device relative to the physical environment.

As one example, as shown in FIG. 4B, the CGR content 420b is configured in order to blend the display device 130 and the video content 410 displayed thereon into the CGR content 420b. As another example, as shown in FIG. 5B, the CGR content 520b is configured in order to blend the display device 130 and the video content 510 displayed thereon into the CGR content 520b.

In some implementations, as represented by block 7-5b, modifying the CGR environment includes framing the one or more output devices relative to the CGR environment. For example, the video content corresponds to a fire and the display device is framed in the CGR environment as a fireplace. As another example, the video content corresponds to content outside a window and the display device is framed in the CGR environment as a window. In some implementations, the device modifies the CGR environment based on coordinates of the display device relative to the physical environment.

As one example, as shown in FIG. 4C, the CGR content 432 (e.g., a CGR fireplace) is configured in order to frame the display device 130 and the video content 410 displayed thereon within the CGR content 420c. As another example, as shown in FIG. 5C, the CGR content 532 (e.g., a CGR fireplace) is configured in order to frame the display device 130 and the video content 510 displayed thereon within the CGR content 520c.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, non-transitory memory and one or more processors coupled with the non-transitory memory:
    presenting, by the device, a computer-generated reality (CGR) environment on the display;
    while presenting the CGR environment, detecting access to a display device separate from the device;

in response to determining that there is access to the display device, triggering the display of video content on the display device by causing the display device to obtain the video content and playback the video content; and modifying at least a portion of the CGR environment presented on the display based on the video content displayed by the display device by:

removing, from the display, CGR content that covered the display device;

enabling optical see-through or video pass-through of the display device to allow a user of the device to view the video content being displayed by the display device through the display of the device; and not rendering CGR content for pixels that correspond to the optical see-through or the video pass-through to reduce resource consumption of the device.

2. The method of claim 1, further comprising:
detecting access to an audio output device; and
in response to determining that there is access to the audio output device, triggering the generation of audio content, associated with the CGR environment, via the audio output device in order to supplement the CGR environment.

3. The method of claim 1, wherein modifying at least the portion of the CGR environment includes blending the display device into the CGR environment.

4. The method of claim 1, wherein modifying at least the portion of the CGR environment includes framing the display device within the CGR environment.

5. The method of claim 1, wherein the CGR environment skins at least a portion of a physical environment.

6. The method of claim 5, wherein the display device is present within the physical environment.

7. The method of claim 1, wherein detecting access to the display device includes detecting the display device within a physical environment by performing object recognition on image data obtained from one or more exterior-facing image sensors.

8. The method of claim 1, wherein detecting access to the display device includes obtaining a beacon signal from the display device.

9. The method of claim 1, wherein detecting access to the display device includes determining that the display device is connected to a network.

10. The method of claim 1, wherein detecting access to the display device includes determining whether or not the display device is capable of obtaining video content.

11. The method of claim 10, wherein determining whether or not the display device is capable of obtaining the video content includes determining whether or not the display device is connected to a network.

12. The method of claim 10, wherein determining whether or not the display device is capable of obtaining the video content includes determining whether or not the display device has access to appropriate software.

13. The method of claim 1, wherein the CGR environment is associated with predetermined content.

14. The method of claim 1, wherein the CGR environment is associated with emergent content.

15. The method of claim 1, wherein triggering the display of video content on the display device comprises transmitting the video content to the display device.

16. The method of claim 1, wherein triggering the display of video content on the display device comprises requesting the display device to playback the video content.

17. The method of claim 1, wherein modifying at least a portion of the CGR environment based on the video content comprises:
modifying the CGR environment in real-time as the video content changes.

18. The method of claim 1, further comprising generating the video content based on the CGR environment.

19. A device comprising:
one or more processors;
a display;
a non-transitory memory; and
one or more programs stored in the non-transitory memory, which, when executed by the one or more processors, cause the device to:
present, by the device, a computer-generated reality (CGR) environment on the display;
while presenting the CGR environment, detecting access to a display device separate from the device;
in response to determining that there is access to the display device, trigger the display of video content on the display device by causing the display device to obtain the video content and playback the video content; and
modify at least a portion of the CGR environment presented on the display based on the video content displayed by the display device by:
removing, from the display, CGR content that covered the display device;
enabling optical see-through or video pass-through of the display device to allow a user of the device to view the video content being displayed by the display device through the display of the device; and
not rendering CGR content for pixels that correspond to the optical see-through or the video pass-through to reduce resource consumption of the device.

20. The device of claim 19, wherein the one or more programs further cause the device to:
detect access to an audio output device; and
in response to determining that there is access to the audio output device, trigger the generation of audio content, associated with the CGR environment, via the audio output device in order to supplement the CGR environment.

21. The device of claim 19, wherein the CGR environment skins at least a portion of a physical environment.

22. The device of claim 21, wherein the display device is present within the physical environment.

23. A non-transitory memory storing one or more programs, which, when executed by one or more processors of a device including a display, cause the device to:
while presenting a computer-generated reality (CGR) environment on the display, detect access to a display device separate from the device; and
modify at least a portion of the CGR environment based on video content displayed by the display device by:
removing CGR content that obscured the display device;
enabling optical see-through or video pass-through of the display device to allow a user of the device to view the video content being displayed by the display device through the display of the device; and
not rendering CGR content for pixels that correspond to the optical see-through or the video pass-through to reduce resource consumption of the device.

24. The non-transitory memory of claim 23, wherein the one or more programs further cause the device to:
   detect access to an audio output device; and
   in response to determining that there is access to the audio output device, trigger the generation of audio content, associated with the CGR environment, via the audio output device in order to supplement the CGR environment.

25. The non-transitory memory of claim 23, wherein the CGR environment skins at least a portion of a physical environment.

26. The non-transitory memory of claim 25, wherein the display device is present within the physical environment.

* * * * *